O. P. FRITCHLE.
CURRENT GENERATING PLANT.
APPLICATION FILED NOV. 15, 1920.

1,391,377.

Patented Sept. 20, 1921.
2 SHEETS—SHEET 1.

Inventor
Oliver P. Fritchle
By Byrnes, Townsend & Brickenstein
Attorneys

O. P. FRITCHLE.
CURRENT GENERATING PLANT.
APPLICATION FILED NOV. 15, 1920.
1,391,377.
Patented Sept. 20, 1921.
2 SHEETS—SHEET 2.
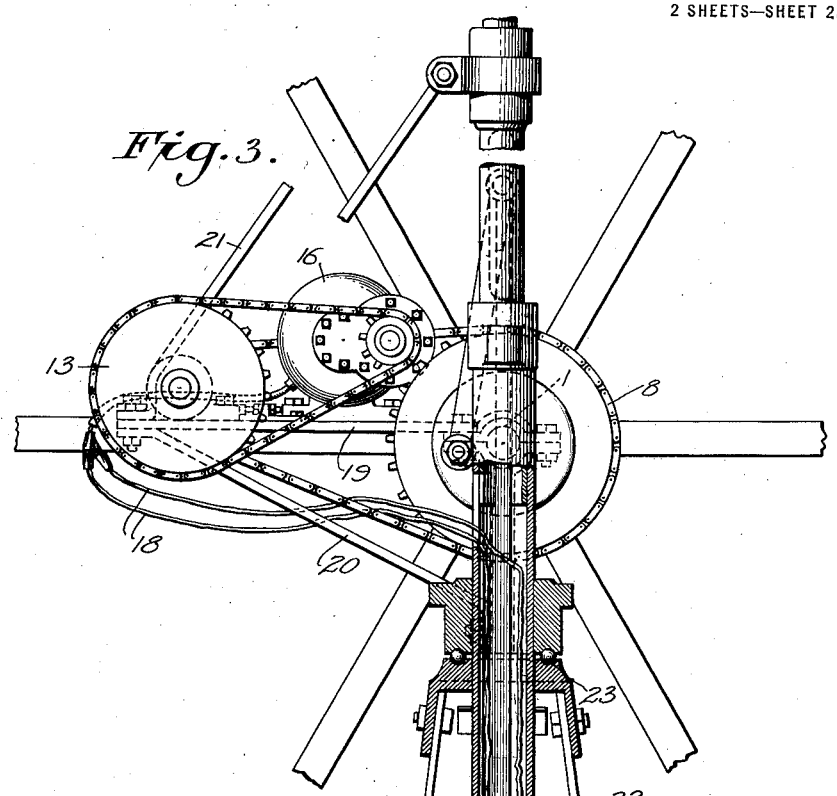
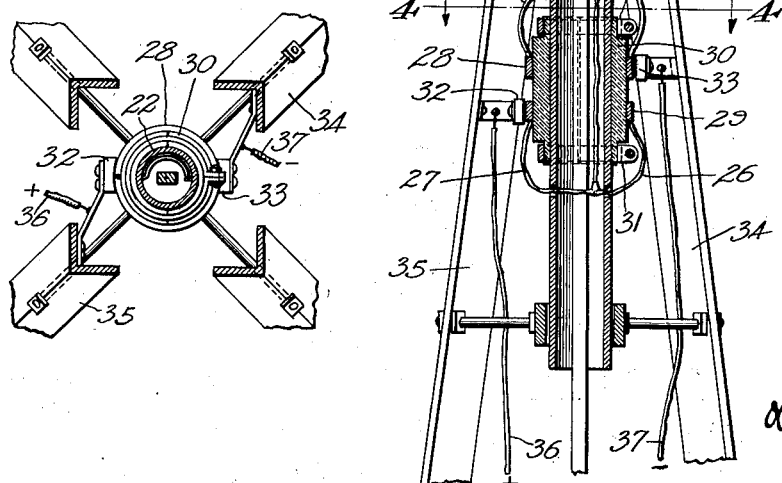

UNITED STATES PATENT OFFICE.

OLIVER P. FRITCHLE, OF DENVER, COLORADO.

CURRENT-GENERATING PLANT.

1,391,377.   Specification of Letters Patent.   Patented Sept. 20, 1921.

Application filed November 15, 1920. Serial No. 424,274.

*To all whom it may concern:*

Be it known that I, OLIVER P. FRITCHLE, a citizen of the United States, residing at Denver, in the county of Denver and State of Colorado, have invented certain new and useful Improvements in Current-Generating Plants, of which the following is a specification.

This invention relates to means for supporting a current generating plant on the windmill, whose wheel drives the generator.

The main purpose of the invention is to provide a self-contained current generating plant, which can readily be attached to a wind-wheel of any of the ordinary types now in use.

The invention will be understood from the accompanying drawings in which—

Fig. 3 is a side elevation, parts being shown in section.

Fig. 4 is a horizontal section looking down on plane 4—4 of Fig. 3.

Figure 1:
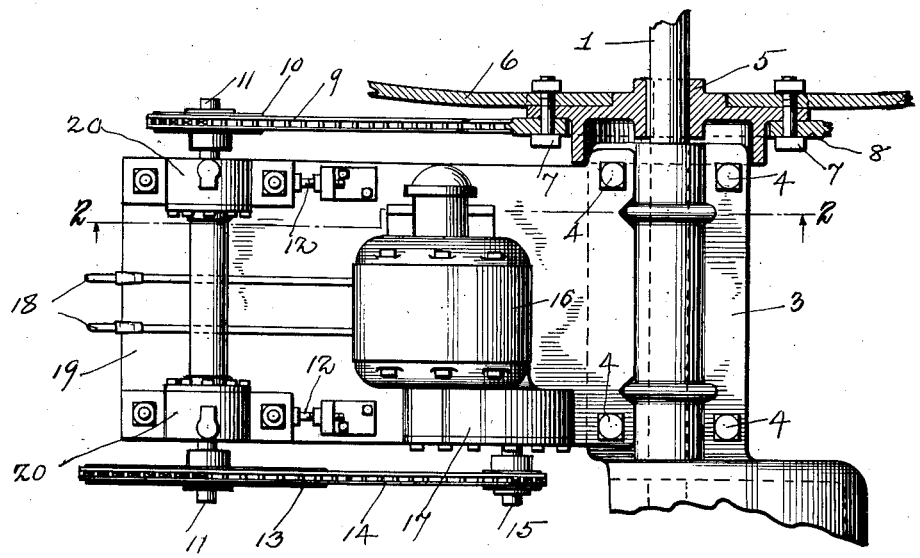
Figure 1 is a plan view of the generating plant attached to the wind-mill, with some of the parts shown in section.
Figure 2:
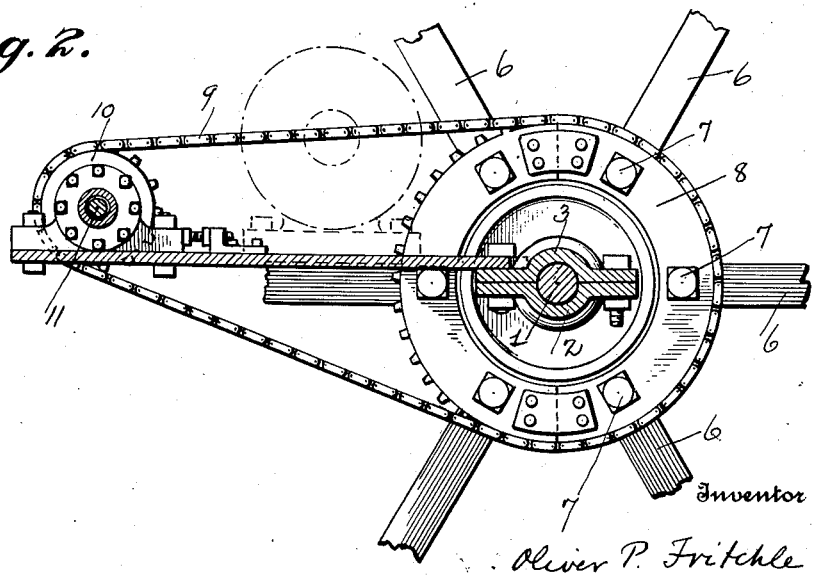
Fig. 2 is a sectional elevation on plane 2—2 of Fig. 1.

The shaft 1 of the wind wheel is journaled between a lower bearing plate 2, and an upper or cap plate 3, the bearing plates being secured together by bolts 4, 4. To the hub 5 of the wind wheel are secured spokes 6, by bolts 7, 7. A split sprocket wheel 8 is secured to the wheel by these same bolts.

A driving chain 9 passes over sprockets 8 and 10, the latter mounted on a shaft 11, journaled in self-adjusting ball-bearings 20, of any well known type, these bearings being adjustable by screws 12, to take up any slackness in the driving chains. The shaft 11 carries at its outer end a sprocket 13, which, through chain 14, drives a sprocket on shaft 15, which in turn drives through any form of reduction gearing 17, the armature shaft of the dynamo-electric generator 16. Wires 18, conduct the current away from the generator to the point of use.

The dynamo and counter shaft 17 are mounted on a rigid metal plate 19 which is provided at one end with openings spaced, so that bolts 4, 4 may pass through these openings, and the plate 19 is then firmly secured in place by screwing down the bolts. Where the cap-bearing plate is provided with ribs, the plate 19 is provided with corresponding grooves.

The current generating plant may thus be secured to any existing windmill structure, without any other fastening means than those already present.

It will be noted that the generator 16, is located on the platform 19, near the main support of the platform, between the countershaft and main wheel shaft so that there will be no excessive weight on the outer end of the platform. This platform 19 may be braced by braces, 20, and, 21, extending to suitable points on the main frame, of the windmill. This main frame, in the type of windmill shown, consists of a casting combined with a steel tube, 22, the frame as a whole being rotatably mounted, as on a ball bearing, 23. In order to convey the current to the place of use on the ground, the conductors, 18, may be led, as shown down through this tube, 22, the end of each wire being connected by wires, 24, 25, 26 and 27 to corresponding portions of split slip rings, 28, 29, which are secured to a split-wooden drum clamped by clamps, 31, 32, to the pipe 22. Contact brushes, 32, 33, take off the current from the rings. The brushes are attached to the supports, 34, 35, forming parts of the tower. 36, 37, are conductors connected to the contact brushes.

The current generating plant and the means for leading off the current generated are thus capable of application to the windmill, without substantial change in the existing structures.

I claim:

1. A current generating plant comprising a wind wheel, a shaft therefor, upper and lower bearing plates secured by bolts, and a driving member secured to the wheel, in combination with a current generating plant comprising a dynamo-electric generator and gearing by which it is driven from said driving member, said generator and gearing being secured to a rigid plate having apertures through which are passed the bearing bolts.

2. The combination with a wind mill including a wind wheel, a shaft, upper and lower bearing plates for the shaft, and bolts for securing the said plates together, of a platform having near one edge holes adapted to register with said bolts, a current generator mounted upon the platform and means for translating the motion of the wind wheel to the generator.

3. Apparatus according to claim 2 in which the motion-translating means includes driving mechanism constructed and arranged to be secured to the wind wheel and in which the remaining translating mechanism is mounted upon the platform forming therewith a single structural unit.

4. Apparatus according to claim 3 in which the translating mechanism includes gearing connected with the dynamo, a countershaft mounted on the platform and motion-transmitting mechanism between the driving mechanism and the countershaft and between the countershaft and the gearing.

In testimony whereof, I affix my signature.

OLIVER P. FRITCHLE.